Sept. 25, 1928.

I. J. WENZKA

LIQUID STRAINER

Filed March 2, 1927

1,685,655

INVENTOR
Ignace J. Wenzka
BY
ATTORNEY

Patented Sept. 25, 1928.

1,685,655

UNITED STATES PATENT OFFICE.

IGNACE J. WENZKA, OF DEPEW, NEW YORK.

LIQUID STRAINER.

Application filed March 2, 1927. Serial No. 172,110.

It is well known to those skilled in the art that in liquid strainers where the liquid is forced against the screen under considerable pressure, the screen will become easily clogged, remaining so until it has been removed and cleaned by a manual operation.

I have discovered that where the liquid being strained is allowed to rise from a point below the screen and then to flow through the same, that the screen will remain clear for a longer period of time, since a large part of the material which would otherwise be carried against the screen has opportunity to settle to the bottom of the strainer casing.

The principal object of my invention has been, therefore, to overcome the disadvantages found in liquid strainers of the present day and to provide a strainer in which the liquid shall have a lateral flow in the strainer body before being passed through the screen thereof, whereby the foreign matter has an opportunity to settle.

Another object has been to provide a device in which the relatively clean oil shall rise into ports adjacent the straining medium of the device, whence it passes into and through such straining medium.

Moreover, the straining medium of my device is preferably in the form of a double screen which is so constructed that the oil is obliged to make three passes through the same.

Furthermore, my device is easily cleaned and is simple and inexpensive to manufacture.

The above objects and advantages have been accomplished by the device shown in the accompanying drawings, of which:

Figure 1:
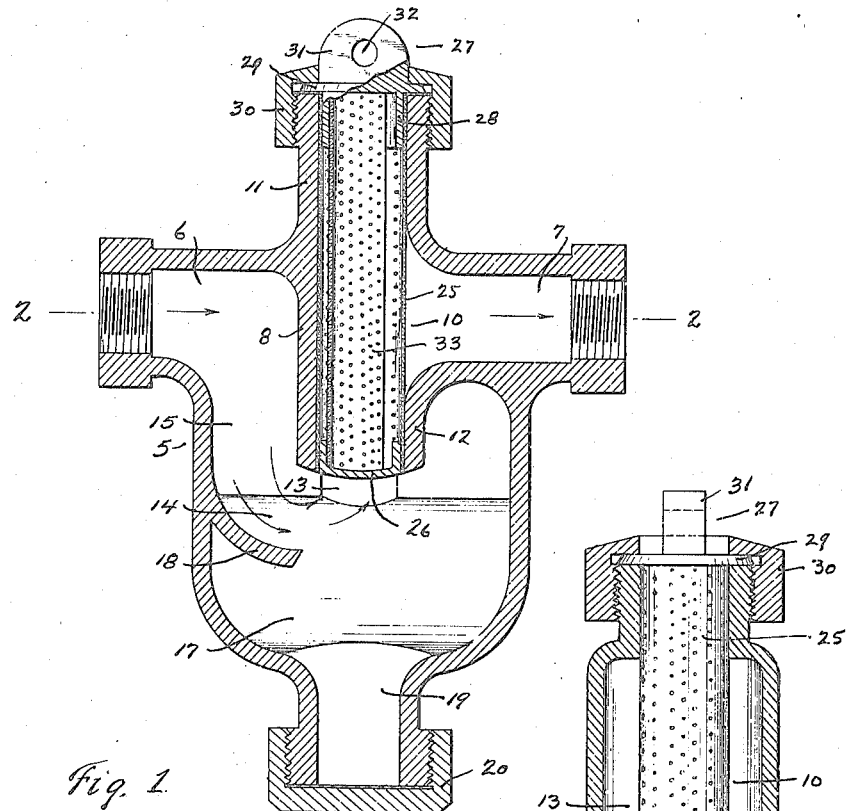
Fig. 1 is a side, sectional view of my device.
Figures 2, 3:
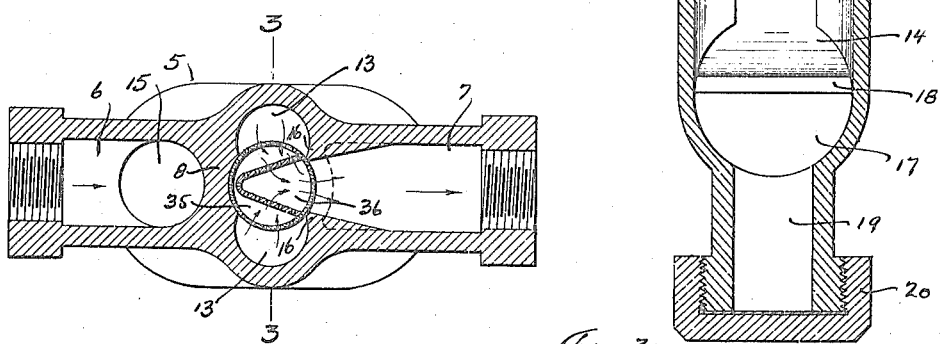
Fig. 2 is a sectional plan view taken on line 2—2 of Fig. 1.
Fig. 3 is a sectional view taken on line 3—3 of Fig. 2.

My device comprises a casing 5 having a liquid inlet 6 and a liquid outlet 7. The liquid inlet and outlet are separated by a wall 8 which extends laterally across the casing. A strainer element 10 is carried by the casing and held by an upstanding portion 11 formed as a part of the casing. The strainer element extends down into the casing and in contact with the wall 8. A wall 12 is arranged opposite the wall 8 below the outlet opening 7 and serves to close the outlet opening to the passage of liquid directly from the interior of the chamber 5. An oil port 13 is provided in each side of the casing 5 and extends up into the portion 11, thus conducting the liquid to be strained from the lower chamber 14 of the strainer casing 5 up between the walls 8 and 12 and into the upwardly extending portion 11 of the casing, thus bringing the liquid into contact with opposite faces of the strainer element. The inlet opening 6 of the casing is connected with the chamber 14 thereof by means of a vertical passageway 15. The outlet opening 7 is somewhat restricted as shown in Fig. 2 where it terminates at the straining element 10 and it is separated from the liquid ports 13 on each side by a thin wall 16, whereby all available screening surface is exposed to the passage of the liquid.

The casing 5 is provided with a sump 17 which is partially separated from the chamber 14 of the casing by means of a curved wall 18. This wall is arranged beneath the passageway 15 and serves to deflect the incoming liquid laterally across the casing. This serves to give opportunity for the foreign matter to settle to the sump 17, and in being deflected across the casing above the sump the incoming flow of oil is thus prevented from stirring up the foreign matter already accumulated in the sump. The sump is provided with an outlet opening 19 having a cap 20 fitted thereon, whereby the accumulation in the sump may be easily and quickly removed.

The strainer element 10 of my device preferably comprises an outer strainer 25 cylindrical in form and fitted into cylindrical portions formed in the casing and extension 11. This outer strainer is provided with an imperforate cap 26 at its lower end, whereby it is closed at this point against the entrance of liquid. Arranged at the upper end of the strainer element is an attaching cap 27, which is provided with an inwardly extending wall portion 28 to which the outer screen 25 is secured. The cap 27 is also provided with an annular flange 29, and this flange is disposed on the upper end of the upwardly extending portion 11. A nut 30, screw-threaded to the upper end of the portion 11 and engaging the flange 29, serves to hold the cap 27 in place. An upwardly extending lug 31 is provided on the cap 27 and it is formed with an aperture 32, whereby the strainer element may be easily removed from the casing and handled during the cleaning operation. Arranged within the outer cylindrical strainer 25 is an inner strainer 33. The inner strainer is preferably V-shaped in form and its vertical edges are secured by any suitable means, as for instance soldering to the interior surface of the outer strainer 25. The edges of the inner strainer are so positioned that they come substantially opposite the walls 16 of the casing or in such a position that the liquid within the outer strainer 25 must pass through the inner strainer also before it can pass into the outlet 7.

As shown by the arrows in the drawings, the liquid being strained will enter the inlet opening 6, pass downwardly through the passageway 15 connected therewith and then be deflected laterally across the chamber 14 of the casing by the curved wall 18. In its lateral passage, a large percentage of the foreign matter will settle into the sump 17 while the relatively clean oil will be caused to rise up into the ports 13 formed in the casing and member 11. In its passage upwardly into the ports 13, the liquid will be brought into contact with the opposite sides of the outer strainer 25 and will pass therethrough. After passing through the sides of the outer strainer 25 the liquid will enter a chamber 35 formed between the outer strainer 25 and the inner strainer 33. From this chamber the liquid will pass through both sides of the inner strainer and into a chamber 36 formed between the interior surface of this strainer and the adjacent surface of the outer strainer. From the chamber 36 the fluid will pass through that part of the outer strainer which lies between the V-shaped walls of the inner strainer and enter the outlet opening 7 of the device.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention what I claim is:

1. A liquid strainer comprising a casing having inlet and outlet openings, a vertically arranged dividing wall between the inlet and outlet openings of the casing, a sump formed at the lower part of the casing, and a vertically arranged removable strainer element adjacent the dividing wall and having a longitudinal portion of its periphery in contact with the wall, the casing being formed with vertical inlet ports at one side of the dividing wall and on opposite sides of the strainer for conducting the liquid from opposite points to the exposed portions of the strainer.

2. A liquid strainer comprising a casing having inlet and outlet openings, the casing being formed with a vertical passageway connected at its upper end with the inlet opening, a sump formed in the lower part of the casing, a removable strainer element arranged in the upper part of the casing, and a laterally extending deflecting wall arranged below the vertical passageway and the strainer element, whereby the incoming fluid is prevented from stirring up the accumulated foreign matter in the sump.

3. A liquid strainer comprising a casing having inlet and outlet openings, a sump formed in the lower part of the casing, a removable strainer element arranged in the upper part of the casing, and a deflecting wall arranged below the strainer element and on the inlet side of the casing, the casing being formed with vertical ports for conducting the liquid to the exposed portions of the strainer element.

4. A liquid strainer comprising a casing having inlet and outlet openings, a sump formed in the lower part of the casing, and a removable strainer element arranged in the upper part of the casing, the strainer element comprising an outer strainer and an inner strainer, the inner strainer being disposed within the outer strainer and having its longitudinal edges secured to the outer strainer at points adjacent the sides of the outlet opening of the casing, the strainers being so arranged that the liquid is forced to pass through more than one strainer wall.

5. A liquid strainer comprising a casing having inlet and outlet openings, a vertically arranged dividing wall between the inlet and outlet openings of the casing, vertical inlet ports formed in the casing at one side of the wall, and a vertically arranged removable strainer element adjacent the dividing wall and between the inlet ports, the strainer element consisting of a plurality of interspaced strainers, comprising an outer strainer and an inner strainer so arranged that the fluid in passing through the strainers will be strained more than once.

6. A liquid strainer comprising a casing having inlet and outlet openings, and a strainer element carried by the casing, the strainer element comprising an outer strainer and an inner strainer, the inner strainer being disposed within the outer strainer and having its longitudinal edges secured to the outer strainer at points adjacent the sides of the outlet opening of the casing, an imperforate cap provided at the lower end of the element, and an attaching cap provided at the upper end of the element.

7. A liquid strainer comprising a casing having inlet and outlet openings, a strainer element detachably carried by the casing, the casing being formed with vertical ports adjacent the strainer element, separating walls contacting with the element and separating the ports from the outlet opening of the casing, the strainer element comprising an outer strainer and an inner strainer, the inner strainer being arranged within the outer strainer and having its vertical edges secured to the outer strainer at points substantially opposite the separating walls.

8. A liquid strainer comprising a casing having inlet and outlet openings, a sump formed in the lower part of the casing, and a removable strainer element arranged in the upper part of the casing, the strainer element comprising an outer cylindrical strainer, and an inner strainer having one of its sides open and having its longitudinal edges along the open side secured to the outer strainer at points adjacent the sides of the outlet opening of the casing.

9. A liquid strainer comprising a casing having inlet and outlet openings, a sump formed in the lower part of the casing, and a removable strainer element arranged in the upper part of the casing, the strainer element comprising an outer cylindrical strainer and an inner V-shaped strainer disposed within the outer strainer, the longitudinal edges of the inner strainer being secured to the outer strainer at points adjacent the sides of the outlet opening of the casing.

10. A liquid strainer comprising a casing having inlet and outlet openings, a sump formed in the lower part of the casing, a removable strainer element arranged in the upper part of the casing, the strainer element comprising an outer cylindrical strainer and an inner strainer disposed within the outer strainer, the inner strainer having one of its sides open and having its longitudinal edges along the open side secured to the outer strainer at points adjacent the sides of the outlet opening of the casing, and a laterally extending, deflecting wall arranged below the strainer element and on the inlet side of the casing.

11. A liquid strainer comprising a casing having inlet and outlet openings, the casing being formed with a vertical passageway connected at its upper end with the inlet opening, and a cylindrical strainer disposed above the lower end of the vertical passageway between the inlet and outlet openings, and having imperforate ends, a portion of the surface of the strainer being exposed to the incoming fluid, and a separate portion of its surface exposed to the outgoing fluid.

12. A liquid strainer comprising a casing having inlet and outlet openings, and a cylindrical strainer disposed between the inlet and outlet openings and comprising an outer cylindrical strainer and an inner strainer, the strainers being closed at both ends, the outer strainer having a portion of its periphery exposed to incoming fluid, and a separate portion of its surface exposed to outgoing fluid, the inner strainer having an open side arranged adjacent the portion of the outer strainer which is exposed to the outgoing fluid.

13. A liquid strainer comprising a casing having inlet and outlet openings, a sump formed in the lower part of the casing, a removable strainer element arranged in the upper part of the casing, the strainer element comprising a cylindrical strainer having closed ends and having a portion of its longitudinal surface exposed to the incoming fluid and a separate portion of its longitudinal surface exposed to the outgoing fluid, and a laterally extending, deflecting wall arranged below the strainer element and on the inlet side of the casing.

14. A liquid strainer comprising a casing having inlet and outlet openings, a vertically arranged dividing wall between the inlet and outlet openings of the casing, the casing being formed with oppositely arranged vertical inlet ports at one side of the wall, and a vertically arranged removable strainer element disposed between the vertical inlet ports and having a portion of its surface exposed to the outlet openings.

15. A liquid strainer comprising a casing having inlet and outlet openings, a vertically arranged dividing wall between the inlet and outlet openings of the casing, a vertically arranged strainer element carried by the casing, the casing being formed with vertically arranged inlet ports disposed at diametrically opposite sides of the strainer, the strainer being exposed to the outlet opening at a point in its circumference substantially at right angles to the inlet ports.

In testimony whereof, I have hereunto signed my name.

IGNACE J. WENZKA.